United States Patent [19]

Szymanski et al.

[11] 3,857,976

[45] Dec. 31, 1974

[54] FOOD PRODUCTS CONTAINING EPICHLOROHYDRIN-INHIBITED, STABILIZED RETORT STARCHES

[75] Inventors: Chester D. Szymanski, Martinsville; Martin M. Tessler, Edison; Harvey Bell, North Plainfield, all of N.J.

[73] Assignee: National Starch and Chemical Corporation, New York, N.Y.

[22] Filed: Dec. 17, 1973

[21] Appl. No.: 425,560

Related U.S. Application Data

[63] Continuation of Ser. No. 251,344, May 8, 1972, Pat. No. 3,804,828.

[52] U.S. Cl.................. 426/167, 426/215, 426/350, 426/407, 426/203
[51] Int. Cl................................................ A23l 1/14
[58] Field of Search ............ 426/167, 215, 350, 407

[56] References Cited

UNITED STATES PATENTS

| | | | |
|---|---|---|---|
| 2,935,510 | 5/1960 | Wurzburg | 426/167 |
| 3,437,493 | 4/1969 | Robinson et al. | 426/215 |
| 3,685,999 | 8/1972 | Kelly | 426/407 |

*Primary Examiner*—Samih N. Zaharna
*Assistant Examiner*—J. M. Hunter

[57] ABSTRACT

Epichlorohydrin-inhibited, hydroxypropyl starch products are described, said products displaying a thin viscosity on normal cooking with water but display a higher viscosity upon being heated at retort temperatures. Such starch products find a particular use in the commercial preparation of canned foods.

7 Claims, No Drawings

FOOD PRODUCTS CONTAINING EPICHLOROHYDRIN-INHIBITED, STABILIZED RETORT STARCHES

This application is a continuation of application Ser. No. 251,344 filed May 8, 1972 now U.S. Pat. No. 3,804,828.

This invention relates to novel modified starch products which in their dispersed form do not attain their full viscosity until after cooking under retort conditions and which are resistant to high temperature deterioration. More particularly, the invention relates to inhibited, stabilized granular starches possessing novel "thin-thick" properties and to the method for their preparation. Starches which do not develop an appreciable viscosity when cooked at atmospheric pressure (and thus are "thin") which, however, display a significantly higher viscosity when retorted (and thus are "thick") are commonly referred to as thin-thick starches.

In the past, the commercial preparation of high quality starch containing food products such as canned puddings, cream soups, sauces and gravies has been complicated by problems arising as a result of the retorting process. The term "retorting" refers to the heating of food products under pressure to temperatures above 212°F. in order to cook or sterilize said products. After being retorted these products often exhibit poor texture and viscosity stability. In the commercial preparation of food products incorporating a starch thickener, it is necessary that the starch displays a good texture (smooth and homogeneous), viscosity stability, and, preferably, thin-thick properties. The initial thin state of the starch dispersion facilitates a more rapid penetration of the system by the heat required for sterilization, thus providing a more efficient means than similar methods applied heretofore in conventional canned food processing. Upon cooling, the cooked starch must thicken in order for the food product in final form to possess a desired viscosity and texture.

It is the prime object of this invention to provide a method for the preparation of starch derivatives which are relatively thin when cooked at atmospheric pressure, but develop significant viscosity after retorting.

It is a further object of this invention to prepare inhibited starches for use in retorted food systems which do not exhibit poor texture and stability.

Various other objects and advantages of this invention will become apparent from the following description.

We have found that cereal starches which have been sufficiently stabilized with propylene oxide and inhibited to within a specified range under controlled conditions by reaction with epichlorohydrin yield starch products having useful thick-thin properties.

In our use of the term "inhibited starch," we refer to a starch in which the disintegration of the starch granules is retarded under conditions whereby the intact starch granules would ordinarily swell and burst. Thus, inhibited starches exhibit a markedly reduced tendency to gelatinize and also display a comparatively short, non-cohesive consistency after cooking. The degree of inhibition can be controlled and varied over a wide range so as to produce starch products in which the swelling of the granules is only slightly retarded, and through successive stages to starch products in which the swelling of the granules is so highly retarded or inhibited that, on cooking in a boiling water bath, the granules cannot remain suspended in water but will, rather, settle out as a separate phase.

It is well known that starch may be inhibited while in granular form by reaction with selected polyfunctional reagents, including epichlorohydrin, to crosslink the starch molecules within the granule. This reaction results in the formation of covalent chemical linkages between the starch molecules, thereby adding to the bonding forces which hold the granule together. This increase in strength in the cohesive forces in the granule thus results in the need for greater energy in order to disrupt the granule upon cooking such inhibited starch in water.

The reaction of the starches herein with propylene oxides yields hydroxypropylated starch derivatives. The hydroxypropyl groups provide the thick-thin starches with properties of good texture and clarity of the starch paste. Typical useful procedures for the preparation of hydroxypropyl derivatives of starch are found in U.S. Pat. Nos. 2,516,632; 2,516,633 and 2,516,634 issued July 25, 1950. It has been determined that the starches of the present invention should have a degree of substitution (D.S.) with respect to the hydroxypropyl group of at least 0.06 and no greater than about 0.3.

The stabilization and inhibition of the starch products of the present invention serve to impart their thin-thick properties as well as to provide their desirable ability to remain stable not only under normal cooking conditions but even after high temperature retorting. The novel feature of these starches lies in the very narrow range of inhibition which will yield the desired thin-thick properties useful in connection with their use as retort starches. Thus, starches which are underinhibited will not show the necessary retardation of rheological changes during pasting while starches which are over inhibited will tend to result in too great a restriction in swelling and low viscosity. The examples will clearly illustrate the necessity of providing the specified degree of inhibition in these starches in connection with the preparation of a food product.

Starches described herein which have been stabilized as well as inhibited to within narrow specified limits show less swelling under normal cooking conditions than starch which has only been stabilized. Moreover, the starches gelatinize at temperatures which are reached only in the retorting process resulting in moderately higher viscosity. Cooking of the starches at 180°F. yields very thin products while cooking at 240°F. produces an increase in viscosity. Upon cooling and standing at room temperature for a period of about 24 hours, there is an additional increase in viscosity.

The modified starches of this invention are characterized by their ability, upon cooking, to display a peak or final viscosity which is more stable than that of a starch which is merely stabilized in the usual manner. The extent to which the final viscosity of the cooked paste is rendered more stable, i.e., resistant to viscosity breakdown, may be correlated to the degree of inhibition achieved in its preparation. In other words, granule swelling together with concomitant viscosity breakdown is restricted by the presence of crosslinking produced by the inhibition treatment.

The applicable starch base materials which may be used in preparing the modified starch products of this invention may be derived from any granular, cereal starches including wheat starch, rice starch and corn starch, with corn starch being perferred. Our use of the term "starch base" is intended to include any initial starting material which may be considered a cereal starch and is in granular form.

The usual process for the preparation of the novel, modified starch products of this invention involves suspending an applicable starch (which has previously been stabilized by reaction with propylene oxide) in an aqueous medium containing epichlorohydrin in order to effect inhibition. The inhibition reaction is normally carried out at a pH level between about 11.3 and 12.3 as the mixture is stirred over a period of about 5 to 8 hours at a temperature ranging from about 35° to about 45°C. The amount of epichlorohydrin necessary in the reaction medium will vary depending on the time and temperature at which the reaction is run and the necessity for having a final product which falls within a specified narrow range of inhibition as determined by its viscosity characteristics. Generally, however, the amount of epichlorohydrin necessary is from about 0.015 to 0.023 parts of epichlorohydrin to 100 parts of starch.

Subsequent to the reaction, the pH level of the suspension is adjusted to about 6.0 by the addition of dilute acid. The suspension is then stirred slightly and filtered to remove the reaction product. Said starch is repeatedly washed and refiltered to remove any residual salts or other contaminants. Finally the resultant starch product is dried to a moisture content of about 12 percent of the total weight. Any conventional means such as oven or air drying is suitable for this purpose.

While the usual process involves the inhibition of a previously stabilized starch it is also possible to reverse the order of reaction and to first inhibit the starch base with the epichlorohydrin and only thereafter react the inhibited starch with the propylene oxide to produce the hydroxy propyl substitution. In this variation of the process the conditions for the inhibition reaction remain as above, and the stabilization reaction is also carried out in conventional manner. The ether cross-linkage formed by reacting epichlorohydrin with starch is very stable under alkaline conditions, and the cross-linkage is not removed during the subsequent propylene oxide reaction.

The inhibition characteristics of the cooked pastes derived from these starch products, as a result of the epichlorohydrin cross-linking, is determined by a two point measurement of the viscosity over a fixed period under very specific conditions. A Brabender Viscograph is typical of the apparatus usually utilized to make such viscosity determinations. This instrument traces a continuous graph record of the viscosity of the test sample, thereby providing viscosity data during the heating, holding, and cooling cycles. The results are reported in Brabender Units (BU). Thus, for example, uninhibited starch products will exhibit relatively high peak viscosities during the heating cycle and relatively large viscosity decreases during a holding cycle, e.g., when maintained for 10 minutes at about 92°C. Furthermore, lightly inhibited starches also exhibit high peak viscosities but do not show the marked viscosity decrease during the holding period which is characteristic of the uninhibited starch product. On the other hand, moderately inhibited products do not exhibit any peak viscosities but do undergo viscosity increases during the holding period. Hence, it is preferred that the starch products herein have a Brabender viscosity of 250–600 BU at 92°C. and 475–650 BU at 92°C. plus 10 minutes holding time with the latter being greater than the former. The Brabender viscosity is determined herein using a pH 3.0 buffered aqueous system.

The change in viscosity of the cooked pastes prepared from these inhibited, stabilized starch products, due to retorting, may be determined by means of a Bostwick Viscometer. The Bostwick viscosity is measured in terms of the distance which a sample flows in 60 seconds on an inclined plane. The greater the distance traveled, the lower the viscosity.

The inhibited starch products of this invention are particularly useful in the food industry where they may be employed as thickeners for pies, sauces and soups, baby foods, etc. They are of particular interest in the canning industry as a result of their unique behavior during retorting of the canned food products. In this use, the starch thickener does not develop an appreciable viscosity when cooked at atmospheric pressure but does develop an appreciable viscosity when cooked under retort conditions. A practical advantage of these inhibited starch products is that the canner can heat the food and starch to retort temperatures much faster than normal because there is better heat transfer into the can. The starch dispersion is initially in the thin state which enables the heat utilized for sterilization of the food product to rapidly penetrate the can and its contents. The shortened cooking time will reduce operating costs and may also improve the quality of the product. Upon cooling, the retorted starch will thicken to give the food product the desired viscosity and texture. Another practical advantage of these inhibited starch products is that the granular, cereal starch may be propylene oxide reacted before or after being inhibited with the epichlorohydrin, without encountering any deleterious effects on the end product.

In preparing food products employing a starch typical of this invention, the addition of fats or vegetable oil is often desirable (although not essential to our invention) in order to obtain desired mouth feel and flavor characteristics for particular food formulations. Other optional ingredients such as emulsifiers, sweeteners, colors and flavors may be added, depending on the requirements of the finished product, without hindering the desired results.

In order to incorporate these starches into a food product, they may merely be put into the form of an aqueous slurry which should contain at least about 50 percent of water, as based on the total weight of components in the final food product. It should be noted that when reference is made to "water" or to "moisture" herein, we contemplate the use of water either in its pure state or as the liquid vehicle of milk, etc. Furthermore, when reference is made to the "non-starch" ingredients of our products, we contemplate such ingredients as fruits, meat, fish, vegetables, flours, cereals, spices, flavors, sweeteners, colorings, preservatives, etc.

The resulting food product is then generally heated to temperatures in the 180° to 195°F. range. The hot food product is thereafter sealed in cans or jars and the containers are subsequently retorted at temperatures of about 250°F. for a period of 20–30 minutes to insure sterility of the contents. The usual treatment is 245° to 250°F. at 15 p.s.i. g. pressure for the time necessary for sterility. Typical examples of the finished products are canned puddings, cream fillings or other similar dessert items, cream soups, sauces and gravies.

It should be emphasized that the above described general procedures for preparing food products is in no way intended as a limitation upon the scope of the invention, since formulas and method for preparing canned foods which contain starch, as well as the usual conventional ingredients, are well known in the art.

In the following examples, which further illustrate the embodiment of this invention, all parts are given in terms of weight, unless otherwise specified. Example I This example illustrates the preparation of the uniquely modified, hydroxypropylated, starch products embodied in this invention.

Into a reaction vessel containing a solution comprising 15 parts of sodium hydroxide and 300 parts of sodium sulfate in 2,000 parts of water there was introduced 1,000 parts of corn starch. The suspension was briefly stirred, and thereafter there was added to the slurry 75 parts of propylene oxide. The vessel was sealed, and the contents therein were allowed to react for 16 hours at 40°C., while the vessel was continuously tumbled to assure uniform suspension of the starch throughout the mixture. Upon completion of this initial reaction, a sample of the product was extracted from the vessel and it was determined that the hydroxypropylated starch therein had a D.S. of 0.14. The pH of the reaction mixture was 11.7. Shortly thereafter 20.0 parts of an aqueous epichlorohydrin (1.0 percent by weight) solution was added to the vessel. The epichlorohydrin was then reacted with the starch for 5 hours at 40°C., as the vessel was again continuously tumbled. The pH of the resultant solution was adjusted to 6.0 by the addition of 74.8 parts of a 21.1 percent hydrochloric acid solution. The epichlorohydrin inhibited starch was recovered by filtration, followed by repeated washings and subsequent drying.

This example illustrates the necessity of employing a hydroxypropyl starch having a D.S. within the prescribed range as well as the proper amount of inhibition in order to obtain thin-thick properties.

A. A series of inhibited, granular cereal starches were each prepared in a manner similar to that employed in Example I, except herein the amounts of propylene oxide and epichlorohydrin were varied. The products obtained thereby were then tested and evaluated for their utility as thin-thick starches.

B. Samples of the above described, inhibited starches were first tested for their Brabender viscosity characteristics, using a pH 3.0 buffered system as follows:

Solution A was prepared by adding 210.2 grams of citric acid monohydrate to a 1 liter, volumetric flask and adding thereto distilled water to the 1,000 ml. mark. Then solution B, comprising 98.0 grams of trisodium citrate dihydrate also in an amount of distilled water necessary to make 1 liter of solution was similarly prepared in another 1 liter, volumetric flask. Thereafter 23.0 grams (anhydrous) of each test sample were placed in separate beakers which contained 50.0 grams of a buffer solution comprising 1.5 parts of the said solution A to each 1.0 part of solution B. A sufficient quantity of distilled water was then added to each beaker to achieve a final weight of 460.0 grams. Each of the slurries, thus obtained, were introduced into the Brabender unit at room temperature (25°C.), and then rapidly heated to 92°C. and held at that temperature for 10 minutes. In each instance the viscosity was measured, using a 350 cm g sensitivity cartridge. The viscosity when the temperature first reaches 92°C. and 10 minutes after the temperature reaches 92°C. is recorded and the results are presented in Table I.

C. Additional samples of the inhibited, starch product prepared in accordance with section A above, were first cooked and then retorted and further evaluated using a Bostwick inclined plane viscometer as follows:

Samples comprising 6.0 percent, dry basis, of the starch product suspended in the required amount of distilled water, were prepared in separate, 8-ounce containers. The suspensions were first cooked for 30 minutes at 180°F., and then sealed in the containers, and retorted at 240°F. for periods ranging from 15 to 60 minutes. Bostwick viscosity determinations of the resulting pastes were made immediately after each of the cooking and retort periods. The Bostwick viscosity results and the Brabender results as described in sections B and C above are set forth in Table I below.

Table I

| Sample | % Propylene oxide based on starch | D.S. | % Epichlorohydrin based on starch | Brabender (BU) Initial | Viscosity After 10 Mins. | Bostwick of flow Cooked 180°F. 30 min. | Viscosity (cm during 60 secs.) Retorted 240°F. | | |
|---|---|---|---|---|---|---|---|---|---|
| | | | | | | | 15 min. | 30 min. | 60 min. |
| A | 3.7 | 0.11 | 0.010 | 830 | 640 | 11.5 | 11.8 | 11.3 | 11.0 |
| B | 2.4 | 0.07 | 0.015 | 550 | 610 | 24+ | 19.5 | — | 17.5 |
| C | 3.6 | 0.10 | 0.021 | 410 | 630 | 24+ | 17.5 | 17.0 | 15.3 |
| D | 3.6 | 0.10 | 0.023 | 290 | 510 | 24+ | 17.8 | 17.3 | 16.5 |
| E | 2.4 | 0.07 | 0.025 | 170 | 450 | 24+ | 24+ | 24+ | 24+ |
| F | 2.4 | 0.07 | 0.030 | 50 | 250 | 24+ | 24+ | 24+ | 24+ |

The above data indicates the very narrow inhibition range required for the utility of the particular starch derivatives, as thin-thick applications, in accordance with this invention. The Brabender viscosity results show that samples B, C and D, unlike that of A which remained thick and those of E and F which remained thin throughout the testing, display the viscosity characteristics pertinent to this invention.

The Bostwick viscosity results confirm the usefulness of samples B, C and D as starches having thin-thick properties suitable for food use. Thus, it is seen that these three samples B, C and D show an initial low viscosity which becomes thick after retorting. In contrast, however, sample A is unsuitable because of its initial high viscosity which remains high even after retorting; and samples E and F are likewise unsuitable because they display an initial low viscosity which remains low after retorting.

EXAMPLE III

This example illustrates the ability of pasted starches prepared with the novel, inhibited starch products herein to display the viscosity characteristics pertinent to this invention, upon cooling.

Using additional quantities of dispersions similar to those described in section C of Example II, the 60 minute retort operations of that same example were repeated. In this instance the samples were allowed to cool over a 24 hour period to room temperature (about 25°C.) prior to determining the Bostwick viscosities of the same. Results of these tests compared with those measured immediately after retorting as presented below in Table II.

Table II

| Sample | Bostwick Viscosity Measurements | |
|---|---|---|
| | Fresh | Stored (24 hours) |
| A | 11.0 | 6.0 |
| B | 17.5 | 13.0 |
| C | 15.3 | 10.0 |
| D | 16.5 | 9.8 |
| E | 24+ | 24+ |
| F | 24+ | 24+ |

The data summarized above clearly indicate the applicability of the starches embodied herein in the preparation of food products which may be stored for reasonable periods beyond 24 hours, the period in which any appreciable change in viscosity normally occurs.

EXAMPLE IV

This example illustrates the preparation of a food product having therein a starch based thickener typical of the type embodied in this invention.

Using a sufficient quantity of corn starch, 7.0 percent of propylene oxide (based on the weight of the starch), and a 0.0225% epichlorohydrin solution, respectively, the procedure set forth in Example I was repeated. The inhibited, hydroxypropylated starch thus produced had Brabender readings of 320 BU and 560 BU at 92°C. at the beginning and end of the 10 minute period, using a pH 3.0 buffered system.

A portion of the above described starch product was then admixed with various ingredients usually employed in the preparation of a conventional, creamed mushroom soup. The composition of the test soup comprised the following:

| Ingredient | Concentration in Parts |
|---|---|
| Milk | 35.0 |
| Cream | 8.0 |
| Water | 34.64 |
| Salt (Sodium Chloride) | 1.8 |
| Monosodium Glutamate | 0.03 |
| White Pepper | 0.03 |
| Curry Powder | 0.009 |
| Mushrooms | 10.0 |
| Corn Oil | 3.0 |
| Hydroxypropylated, Inhibited Starch (Anhydrous) | 6.0 |
| Sugar | 0.94 |

The above described cream of mushroom soup formulation was gradually heated to 180°F. at which point an initial Bostwick viscosity reading of 7.75 centimeters was taken. Thereafter two equal portions of the hot mixture were each placed and sealed in eight-ounce containers, one of which was retorted at 240°F. for 15 minutes and the other for 30 minutes at that same temperature. Subsequent viscosity readings of the two soups were 1.75 and 1.25, respectively.

Thus, the above data indicates the unique utility of the present novel inhibited hydroxypropylated starches in the preparation of food products wherein it is imperative that the viscosities thereof be appreciably altered upon reheating under certain conditions. Such is evidenced herein by the significant increase in viscosity indicating that the soup formulation, which was relatively thin at 180°F. became thicker as it was continuously heated to and maintained at 240°F.

Summarizing, it is seen that this invention provides a means of obtaining starch containing food products which are stable to high temperature processing. Variations may be made in materials, proportions and procedures without departing from the scope of this invention.

We claim:

1. A retortable food product containing a starch thickener in which a substantial portion of the starch therein is an epichlorohydrin cross-linked hydroxypropyl cereal starch having a hydroxypropyl D.S. of about 0.06 to about 0.30 and a pH 3 buffered Brabender viscosity of 250–600 BU at 92°C. and 475–650 BU at 92°C. plus 10 minutes, with the viscosity at 92°C. plus 10 minutes greater than the viscosity at 92°C.

2. A retortable food product containing a starch thickener in which a substantial portion of the starch therein is an epichlorohydrin cross-linked hydroxypropyl cereal starch having a hydroxypropyl D.S. of about 0.06 to about 0.30, said cross-links having been obtained by employing from about 0.015 to about 0.023 parts of epichlorohydrin to 100 parts of starch, and having a pH 3 buffered Brabender viscosity of 250–600 BU at 92°C. and 475–650 BU at 92°C. plus 10 minutes, with the viscosity at 92°C. plus 10 minutes greater than the viscosity at 92°C.

3. A retortable food product according to claim 1 wherein said epichlorohydrin cross-linked hydroxypropyl cereal starch is in granular form.

4. A retortable food product according to claim 1 wherein said epichlorohydrin cross-linked hydroxypropyl cereal starch is corn starch.

5. A process for preparing a retortable food product characterized in having a starch thickener more viscous after retorting than prior to retorting comprising heating a retortable food product containing the starch thickener of claim 1 to a temperature of about 240° – 250°F. for a period of time sufficient to sterilize the food product.

6. A process according to claim 5 wherein said epichlorohydrin cross-linked hydroxypropyl cereal starch is in granular form.

7. A process according to claim 5 wherein said epichlorohydrin cross-linked hydroxypropyl cereal starch is corn starch.

* * * * *